Dec. 13, 1949  J. W. THOMAS, SR  2,491,429
VALVE CONSTRUCTION
Filed March 8, 1947

INVENTOR
JAMES W. THOMAS
BY
ATTORNEY

Patented Dec. 13, 1949

2,491,429

UNITED STATES PATENT OFFICE 2,491,429

VALVE CONSTRUCTION

James W. Thomas, Sr., Richmond, Mo.

Application March 8, 1947, Serial No. 733,369

1 Claim. (Cl. 277—41)

My invention is directed to selector valves adapted for use as manual controls between three or more pipes, conduits or other communication lines through which a flowable medium is adapted to be transmitted.

It is an important object of my invention to provide a manually controllable valve connected in a plurality of closed paths such as pipes which contain three or more openings through which a flowable medium is adapted to pass and which embodies two interfitting open-ended rotatable valve elements, one within the other, and having side openings which side openings may be registered with any one of side openings of the valve body to selectively communicate the selected line with the opening in the end of the valve housing.

A further object of my invention is the provision of a selector valve which is relatively inexpensive to manufacture and which is efficient in use and which is adjustable as to the size of opening desired between two or more openings of the valve housing. A further accomplishment is the provision of a valve of the described class having adjustably interfitting valve elements which provide for selective communication between three openings or lines of said unit.

Other and further important objects of my invention will be apparent from the following description and appended claim.

This invention in a preferred form is described in the following specification and an embodiment of my invention is illustrated in the accompanying drawings.

Figures 1, 2, 3:
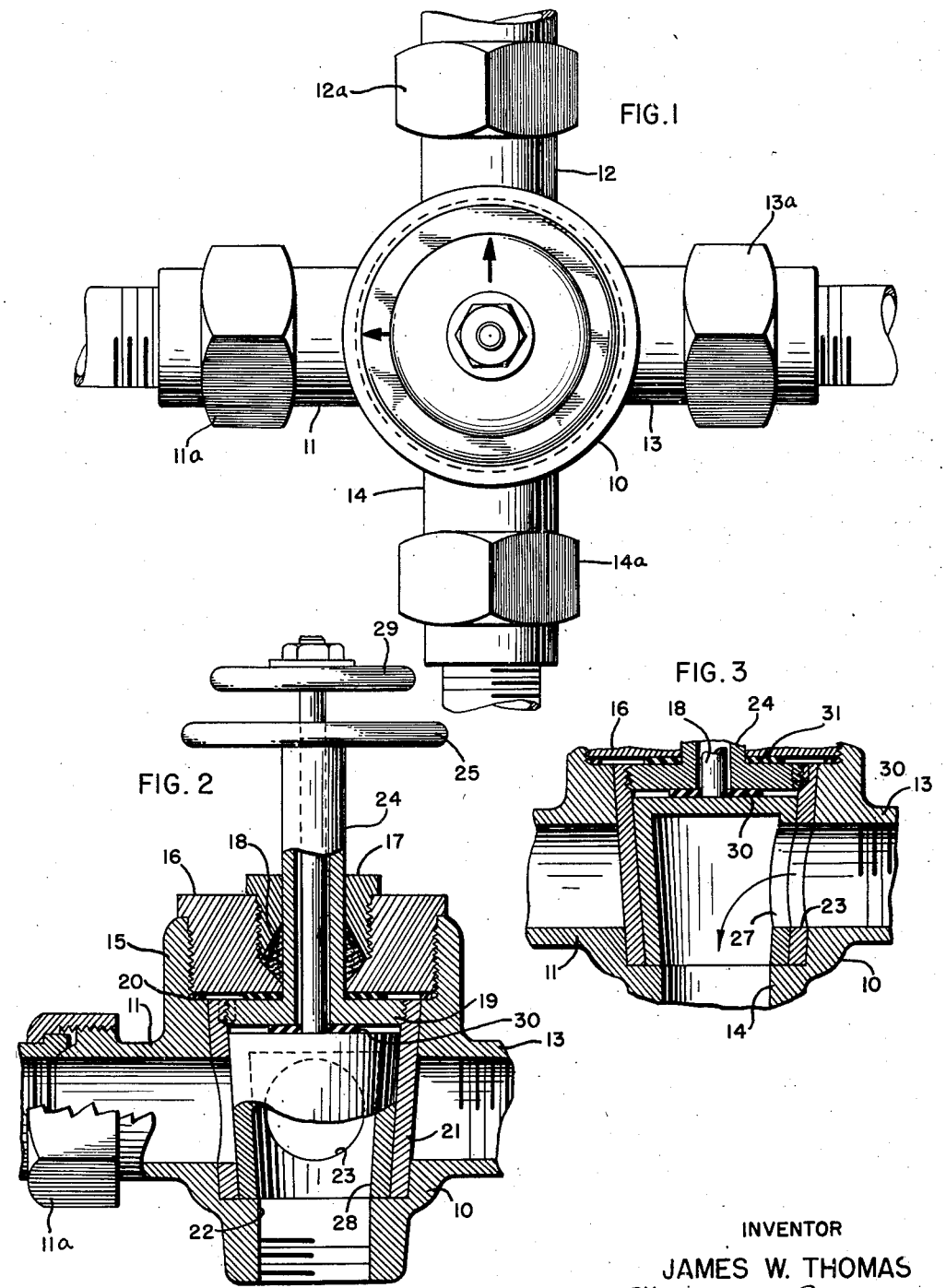
Fig. 1 is an elevational view of one form of my selector valve, viewing exterior parts.
Fig. 2 is a cross sectional view taken on a plane indicated by line 2—2 of Fig. 1.
Fig. 3 is a view showing the valve stopper and interfitting valve element with parts broken away.

Referring to the drawings reference numeral 10 designates a metal housing or valve body having a plurality (in illustration four) of integral nipples 11, 12, 13, and 14 which may terminate in passaged enlarged flanged end portions such as illustrated, on which connecting members such as unions 11a, 12a, 13a, and 14a may be removably mounted to connect the respective pipes which carry the flowable medium. Said nipples may optionally terminate in either external or internal threads by means of which the desired connections to the pipes may be made.

The normally upper portion of the housing or body 10 has an upper opening partially defined by internally threaded integral annular flange 15 in which is removably threaded a centrally passaged closure, bonnet or bushing 16 which has a lower integral flange as indicated. Bushing 16 is internally threaded and a packing nut 17 is threaded therein which compresses and holds packing 18 between it and the flange of bushing 16 and forms a seal about the exterior hollow stem 24. Said stem 24 is preferably integral with externally threaded end wall or cap 19. A gasket 20 is interposed between the bushing 16 and valve body 10.

The valve body 10 has an annular chamber defined by a conical wall and valve seat and a substantially cylindrical metal stopper 21 is seated and is rotatable in said body chamber. Valve body 10 has a lower inwardly extending flange 22 which provides a seat against which the lower ends of valve stopper 21 and valve element 26 rest.

Valve stopper 21 has a round opening 23 in its inclined side wall, as partially shown in Fig. 3 and its lower end has a large opening as shown.

Stopper 21 carries a longitudinally passaged tubular stem 24 which is adapted to be rotated by a lever element or wheel 25. This stopper may be preferably made in two parts, namely the side wall separately, and then after assembly of the stopper and valve element the end wall or cap 19 threaded or otherwise secured in place.

Slidably and rotatably mounted within the stopper 21 is a hollow open ended valve element 26 having a side opening 27 therein. This element fits snugly within stopper 21 and has connected thereto a metal stem 28 which extends upwardly through hollow stem 24 and carries a hand lever or wheel 29 on its upper end. Interposed between the upper walls of stopper 21 and valve element 26 is a washer or gasket 30. Mounted between upper wall of stopper 21 and inner flange of bushing 16 is a sealing washer or gasket 31. The hand wheels or levers 29 and 25 are preferably marked so that an operator will know the relative position of the stopper and valve element and the positions of the parts thereof.

It will be understood that whenever the operator desires all communication to be closed as between all of the body parts, the stopper and valve element will be positioned in non-registering position. Where it is desired that a given pipe be communicated with the bottom opening of the valve, the stopper and valve element are rotated (by means of the stems) into partial or full register with each other and with the particular pipe or passage to be communicated as aforesaid. To close off such given passage either or both the stopper and valve element are rotated so that the parts therein are not in register.

I am aware that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claim.

I claim:

In a selector valve, a hollow metal body having a plurality of side openings and a normally downward opening; hollow nipples integral with said body and each defining a passage, each of the passages in said nipples being connected to one of the openings in said body; a union connected to each of said nipples and adapted to connect each of said nipples to a different fluid supply means; a valve seat having tapered walls in said body; an open ended hollow valve stopper rotatable in said valve, said stopper having an opening, said stopper having tapered walls; a hollow taper-walled valve element rotatable within said stopper and having a side opening and a normally lower opening, said valve element being seated on said valve seat; a cap threaded in the opening in the normally top end of said stopper; a hollow cylindrical stem with a handle thereon connected to said cap; a second stem with a handle thereon connected with the normally upper end of said valve element, said last stem extending through said hollow stem; a sealing gasket around said second stem between said valve element and said valve stopper; said body having a normally upper threaded opening; a bushing threaded in the last opening; a gasket between said bushing and said cap around said hollow stem; and a packing nut threaded in said bushing and positioned around said hollow stem; said stopper and said valve element being manually movable to communicate the lower opening of said body with any one of the other openings thereof.

JAMES W. THOMAS, Sr.

REFERENCES CITED

The following references are of record in the file of this patent:

UNITED STATES PATENTS

| Number | Name | Date |
| --- | --- | --- |
| 616,827 | Deisher | Dec. 27, 1898 |
| 1,078,252 | Cacko | Nov. 11, 1913 |
| 1,354,522 | Takala | Oct. 5, 1920 |
| 1,642,623 | Niven | Sept. 13, 1927 |
| 1,807,081 | Bletcher | May 26, 1931 |
| 2,106,310 | Warrick | Jan. 25, 1938 |

FOREIGN PATENTS

| Number | Country | Date |
| --- | --- | --- |
| 318,747 | Great Britain | Sept. 12, 1929 |